United States Patent [19]
Tuttle

[11] Patent Number: 6,052,062
[45] Date of Patent: *Apr. 18, 2000

[54] CARDS, COMMUNICATION DEVICES, AND METHODS OF FORMING AND ENCODING VISIBLY PERCEPTIBLE INFORMATION ON THE SAME

[75] Inventor: Mark E. Tuttle, Boise, Id.

[73] Assignee: Micron Technology, Inc., Boise, Id.

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,329

[22] Filed: Aug. 20, 1997

[51] Int. Cl.7 .................................................. G06F 7/04
[52] U.S. Cl. ............................. 340/825.31; 340/10.1; 340/10.3; 257/787
[58] Field of Search .................. 340/825.31, 825.34, 340/572.7, 573.1, 825.54; 455/38.2, 106, 73; 342/44, 51, 50; 370/18; 428/36, 219, 341, 483, 910, 913; 359/152, 163; 364/467; 283/901, 904, 874

[56] References Cited

U.S. PATENT DOCUMENTS

| | | | |
|---|---|---|---|
| 4,075,632 | 2/1978 | Baldwin et al. | 343/6.8 |
| 4,461,793 | 7/1984 | Blok et al. | 428/36 |
| 4,593,185 | 6/1986 | Patzelt et al. | 235/382 |
| 4,926,182 | 5/1990 | Ohta et al. | 342/44 |
| 5,166,680 | 11/1992 | Ganot | 340/932.2 |
| 5,245,329 | 9/1993 | Gokcebay | 340/825.31 |
| 5,462,374 | 10/1995 | Kohno | 400/625 |
| 5,493,437 | 2/1996 | Lebby et al. | 359/152 |
| 5,621,412 | 4/1997 | Sharpe et al. | 342/51 |
| 5,649,296 | 7/1997 | MacLellan et al. | 455/38.2 |

Primary Examiner—Michael Tokar
Assistant Examiner—Jean B. Jeanglaude
Attorney, Agent, or Firm—Wells, St. John, Roberts Gregory & Matkin P.S.

[57] ABSTRACT

Cards, communication devices, and methods of forming the same and encoding visibly perceptible information on communication devices are provided. A remote intelligent communication device includes: a card-thin housing including: an upper surface; a lower surface; and at least one side extending between the upper surface and the lower surface forming the card-thin housing, the side having visibly perceptible information thereon; and communication circuitry within the housing configured to at least one of communicate and receive electronic signals. A method of forming a card includes: providing a substrate having: an upper surface; a lower surface, and the upper and lower surfaces individually having a length and a width; and a plurality of sides individually having a thickness less than the lengths and the widths of the surfaces; and encoding visibly perceptible information on at least one of the sides.

49 Claims, 3 Drawing Sheets

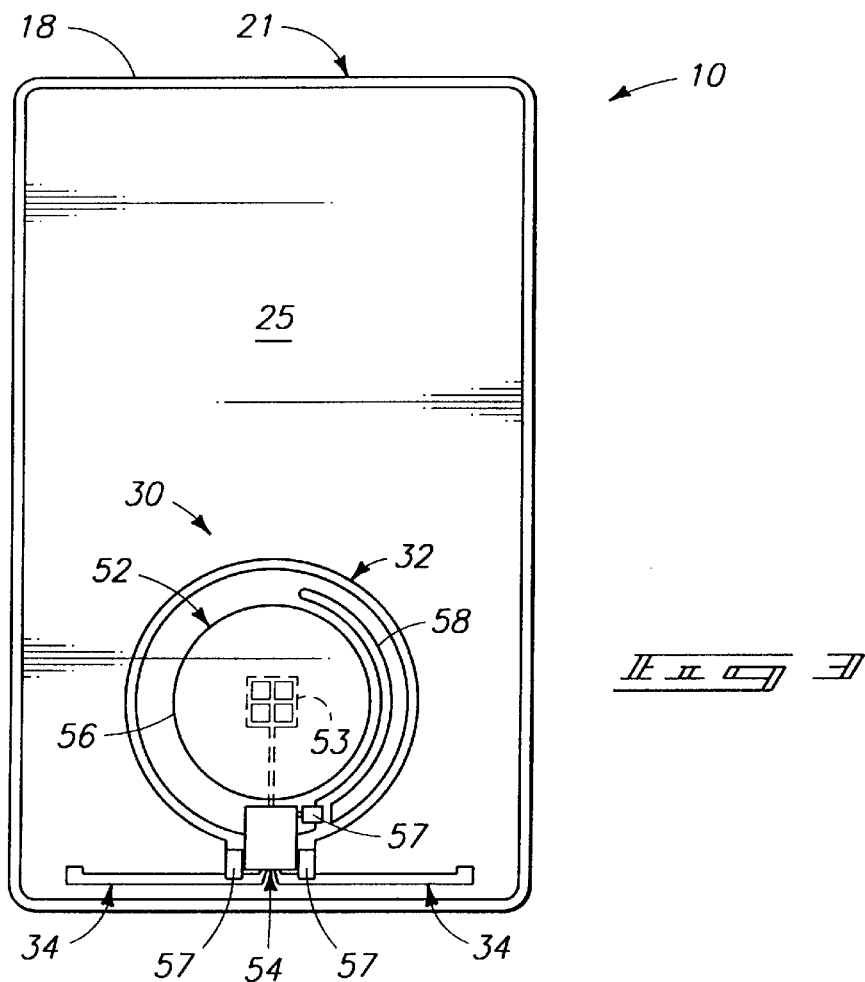
$Fig. 3$
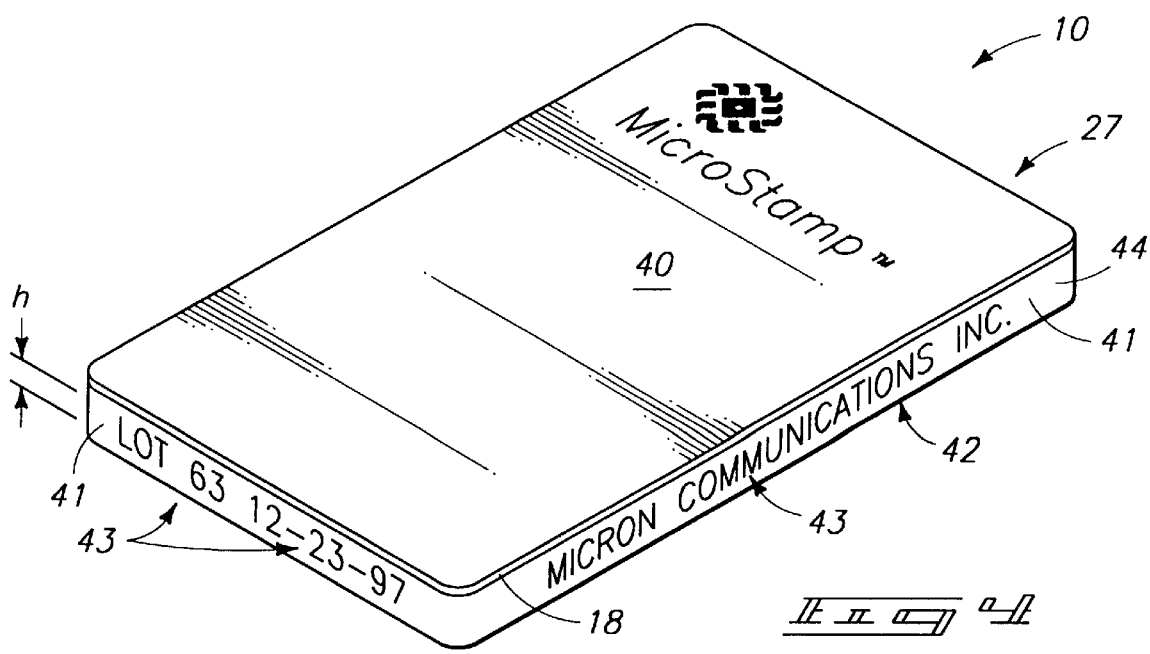
$Fig. 4$

CARDS, COMMUNICATION DEVICES, AND METHODS OF FORMING AND ENCODING VISIBLY PERCEPTIBLE INFORMATION ON THE SAME

TECHNICAL FIELD

The present invention relates to cards, communication devices, and methods of forming and encoding visibly perceptible information on the same.

BACKGROUND OF THE INVENTION

Cards such as credit cards, smart cards, badges, labels, stamps, tags and electronic communication devices including radio frequency identification device (RFID) cards typically include printed information regarding the manufacture or issuance of the card on a face of the card. The faces of such cards are normally used for advertising, embossing, and providing signature panels, magnetic stripes, or end user information. Alternatively, such information regarding the manufacture or issuance of the card is not provided at all.

In many applications, providing of manufacturing or issuance information upon one of the faces of the cards is not cosmetically pleasing to the end user. However, this information is useful for various reasons. For example, the printed information is valuable to the end user for providing issuance information, security and/or tracking of an associated product in many applications.

Therefore, there is a need to provide alphanumeric and other information upon a card without impacting the cosmetic properties of the card, or utilizing space which may be necessary for magnetic stripes, signature lines, or other information.

SUMMARY OF THE INVENTION

One embodiment of the present invention provides a remote intelligent communication device (RIC). The embodiment includes a card-thin housing including at least one side having visibly perceptible information thereon and communication circuitry within the housing and configured to at least one of communicate (i.e., output) and receive electronic signals. Other embodiments of the present invention provide additional electronic communication devices including a radio frequency identification device. The remote intelligent communication device and radio frequency identification devices are wireless communication devices according to preferred embodiments of the present invention.

A second aspect of the present invention provides a card having plural surfaces, and a side intermediate the surfaces. The side has a thickness less than about 100 mils. Indicia is provided on the side.

According to another aspect of the present invention, a communication device is disclosed. The communication device includes a substrate having a support surface, an antenna, transponder circuitry, and a battery. A cured resin is provided upon the support surface, the antenna, the transponder circuitry and the battery. The cured resin and substrate form a housing. Identification indicia is encoded on at least one of the side surfaces of the housing.

Another aspect of the present invention provides a method of forming a card including moving at least one of a card and a print head relative to the other of the card and print head. The method additionally includes encoding visibly perceptible information on a side of the card.

An additional aspect of the present invention provides a method of forming a communication device. This method includes the steps of providing a substrate, an antenna, and communication circuitry and applying and curing an encapsulant to form a housing. The method further includes encoding visibly perceptible information on a side surface of the housing.

Another aspect provides a method of forming a remote intelligent communication device. Additional methods according to the present invention provide methods of encoding visibly perceptible information on a communication device.

BRIEF DESCRIPTION OF THE DRAWINGS

Preferred embodiments of the invention are described below with reference to the following accompanying drawings.

FIG. 3 is a front elevational view of the electronic communication device at an intermediate processing step.

FIG. 4 is an isometric view of the electronic communication device of FIG. 2 having indicia on a side thereof in accordance with the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention provides indicia or other visibly perceptible information upon a side or edge of a card. The present invention is described with reference to the providing of indicia upon a side of an electronic communication device provided in the form of a card. Such indicia may be applied to other types of cards, including, for example, credit cards, smart cards, badges, tags, stamps and labels. In addition, such indicia may be applied to any device having a card-thin housing. As used herein, "card-thin" refers to a housing or other supportive substrate having a thickness less than 200 mils, and preferably less than 100 mils.

The electronic communication device is fabricated in a card configuration in the described embodiment. The described embodiment of the electronic communication device discloses a wireless communication device. The embodiment is illustrative and other configurations of cards, and electronic communication devices within card-thin housings are possible. Exemplary embodiments of electronic communication devices within such housings comprise radio frequency identification devices (RFID) and remote intelligent communication devices (RIC). Remote intelligent communication devices are capable of functions other than the identifying function of radio frequency identification devices.

Figure 1:
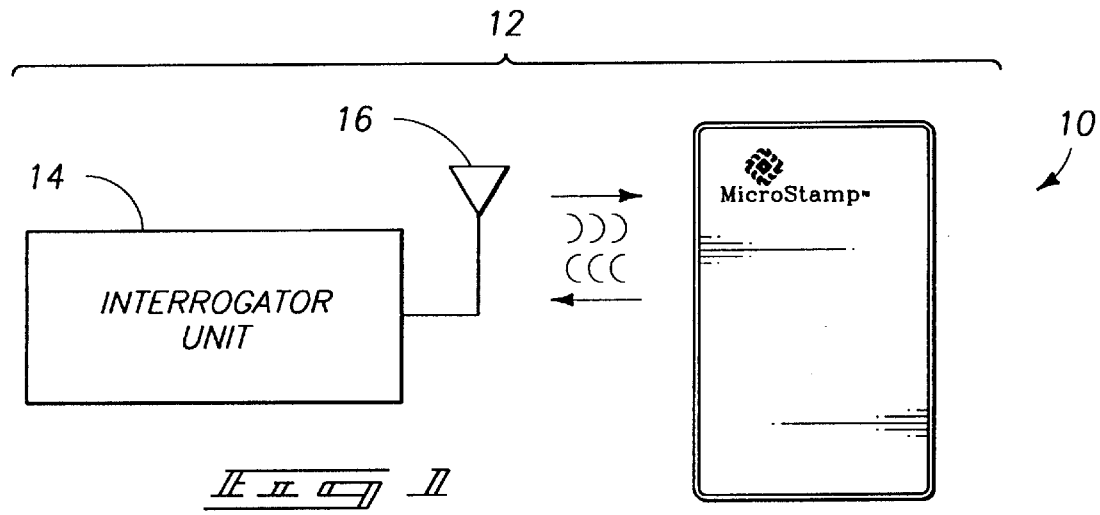
FIG. 1 is a block diagram of an electronic communication system including an interrogator and an electronic communication device.

Referring to FIG. 1, an electronic communication device provided in a card configuration 10 comprises part of a wireless communication system 12. The illustrated communication system 12 further includes an interrogator unit 14. An exemplary wireless communication system 12 is described in U.S. patent application Ser. No. 08/705,043, filed Aug. 29, 1996, assigned to the assignee of the present application and incorporated herein by reference. An exemplary interrogator 14 is described in detail in U.S. patent application Ser. No. 08/806,158, filed Feb. 25, 1997, assigned to the assignee of the present application and incorporated herein by reference.

The electronic communication device or card 10 communicates via electronic signals with interrogator unit 14. Preferably, device or card 10 communicates with unit 14 via wireless electronic signals, such as radio frequency (RF) signals. Wireless electronic signals or radio frequency signals, which include microwave signals, are utilized for communications in the preferred embodiment of communication system 12. Communication system 12 further includes an antenna 16 coupled to the interrogator unit 14 to facilitate communications. Electronic communication arrangements other than wireless are possible within the present invention.

Figure 2:
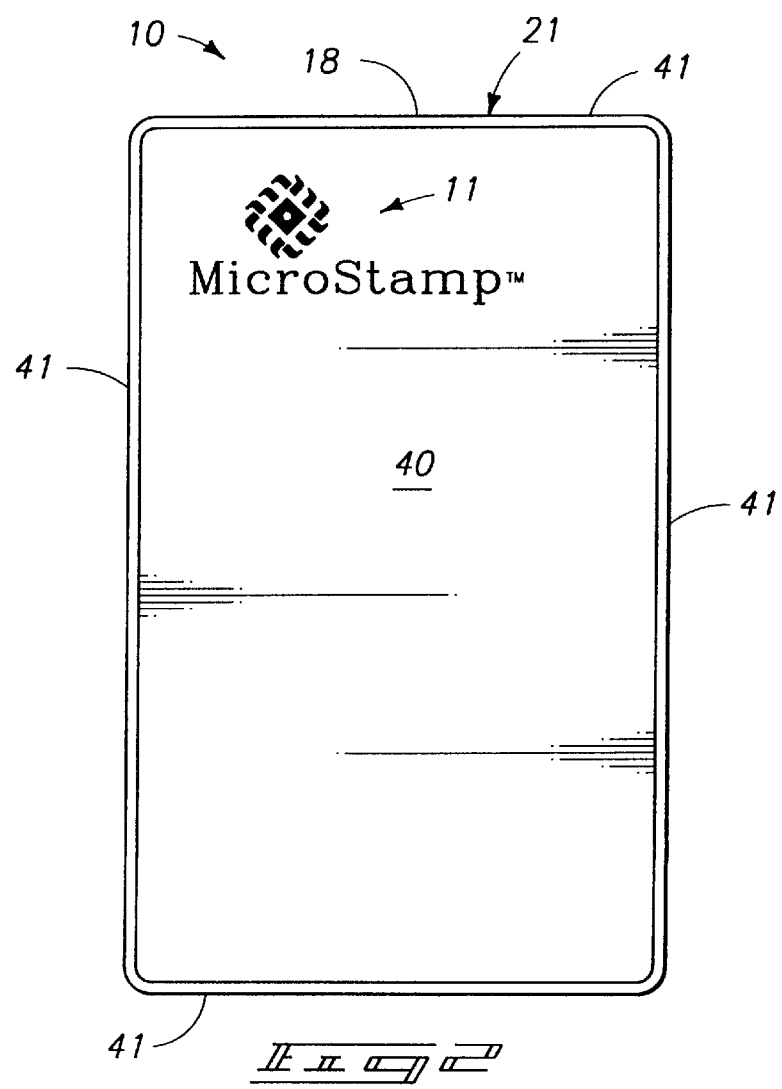
FIG. 2 is a front elevational view of the electronic communication device.

Referring to FIG. 2, the illustrated card 10 includes an insulative first substrate or layer of supportive material 18. Example materials for substrate 18 comprise polyester, polyethylene or polyimide film having a thickness of 4–6 mils (thousandths of an inch). A plurality of ink layers (not shown) are applied to substrate 18 in other embodiments of the invention. Substrate 18 includes an outer periphery 21. The substrate 18 defines a first portion of a housing for the electronic communication device or card 10. A ground plane can be provided over substrate 18 to improve the wireless communications of card 10. A dielectric layer is ideally provided over the ground plane in such embodiments.

An exemplary card 10 includes an upper surface 40, a lower surface 42 (not shown in FIG. 2) opposite surface 40, and a plurality of side surfaces 41 intermediate upper and lower surfaces 40, 42. Inks can be used to convey information such as logos and/or company names, such as those illustrated at 11. The inks may be viewed upon upper surface 40 of card 10.

Referring to FIG. 3, card 10 is shown at an intermediate processing step. A patterned conductive trace 30 is formed or applied over a support surface 25 of substrate 18. A preferred conductive trace 30 comprises silver ink or printed thick film (PTF). One manner of forming or applying the conductive ink is to screen print the ink on the support surface 25 of substrate 18 through conventional screen printing techniques. The conductive ink forms desired electrical connections with and between electronic components which will be described below. In instances where substrate 18 forms a portion of a larger roll of polyester film material, the printing of the conductive trace 30 can take place simultaneously for a number of the to-be-formed electronic communication devices.

The illustrated conductive trace 30 provides antennas 32, 34 which are suitable for respectively receiving and transmitting electronic signals or RF energy. The illustrated antenna 32 constitutes a loop antenna. Other antenna constructions are possible. In other exemplary embodiments, antenna 34 is omitted and antenna 32 is configured to both receive and transmit electronic signals.

Substrate 18 includes outer periphery 21 inside of which a portion, and preferably the entire antenna 32 extends or lies. In particular, the antenna 32 is preferably provided within the confines of periphery 21. According to one embodiment, antenna 32 has a length within the range of 80 mm–95 mm and is tuned to a frequency of 2.45 GHz.

Conductive trace 30 additionally includes a plurality of power source terminals, including a first connection terminal 53 (shown in phantom in FIG. 3) and a second connection terminal 58. Connection terminals 53, 58 are formed on support surface 25 of card 10.

The illustrated card 10 includes a power source 52 and integrated circuit 54 individually mounted on support surface 25 and supported by substrate 18. Power source 52 is provided within antenna 32 in the depicted embodiment. Passive components (e.g., capacitors 57) may also be mounted on support surface 25.

Power source 52 provides operational power to electrical components within card 10, including integrated circuit 54. In the illustrated embodiment, power source 52 is a battery. The battery is preferably a thin profile battery which includes first and second terminals of opposite polarity. More particularly, the battery has a lid or negative (i.e., ground) terminal or electrode, and a can or positive (i.e., power) terminal or electrode.

Conductive epoxy is applied over desired areas of the support surface 25 using conventional printing techniques, such as stencil printing, to assist in component attachment described just below. Alternately, solder or another conductive material is employed instead of conductive epoxy.

Power source 52 and integrated circuit 54 are provided and conductively bonded on the support surface 25 using the conductive epoxy. Integrated circuit 54 can be mounted either before or after the power source 52 is mounted on the support surface 25.

First and second connection terminals 53, 58 are coupled to the integrated circuit 54 by conductive epoxy in accordance with a preferred embodiment of the invention. The conductive epoxy also electrically connects the first terminal of the power source 52 to the first connection terminal 53. In the illustrated embodiment, power source 52 is placed lid down such that the conductive epoxy makes electrical contact between the negative terminal of the power source 52 and the first connection terminal 53.

Power source 52 has a perimetral edge 56, defining the second power source terminal, which is disposed adjacent second connection terminal 58. In the illustrated embodiment, perimetral edge 56 of the power source 52 is cylindrical, and the connection terminal 58 is arcuate and has a radius slightly greater than the radius of the power source 52, so that connection terminal 58 is closely spaced apart from the edge 56 of power source 52.

Subsequently, conductive epoxy is dispensed relative to perimetral edge 56 and electrically connects perimetral edge 56 with connection terminal 58. In the illustrated embodiment, perimetral edge 56 defines the can of the power source 52, such that the conductive epoxy connects the positive terminal of the power source 52 to connection terminal 58. The conductive epoxy is then cured.

First and second connection terminals 53, 58 are coupled with integrated circuit 54 providing operational power and an electrical ground reference thereto. Antenna 32 is coupled with the integrated circuit 54 providing electrical connection therebetween for the transfer of signals corresponding to the wireless electronic signals or RF energy transmitted and received by antenna 32.

Integrated circuit 54 includes suitable communication circuitry for providing wireless communications capabilities within electronic communication device 10. For example, in one embodiment, integrated circuit 54 includes a processor 62, memory 63, and transponder circuitry 64 for providing wireless communications with interrogator unit 14. An exemplary and preferred integrated circuitry package 54 is described in U.S. patent application Ser. No. 08/705,043 incorporated by reference above.

One embodiment of the communication circuitry or transponder circuitry 64 includes a modulator and a receiver operable to respectively communicate (i.e., output) and receive wireless electronic signals. The processor 62 is coupled with transponder circuitry 64 and is configured to process the electronic signals. Responsive to the detection of an appropriate polling signal, processor 62 instructs modulator transponder circuitry 64 to output a identification signal. The wireless electronic signals are transmitted and received via antenna 32 in the illustrated embodiment.

The receiver of transponder circuitry 64 is configured to receive electronic (e.g., wireless) signals and the modulator is configured to output or communicate electronic (e.g., wireless) signals. The modulator comprises an active transmitter or a backscatter device according to certain embodiments. Such outputting or communicating of the electronic signals via the modulator comprises one of transmitting the electronic signals and reflecting received signals. Typically, the modulator is configured to communicate an identification signal responsive to the reception of an appropriate polling signal.

The identification signal outputted via the modulator identifies the particular card 10 communicating the identification signal in accordance with one embodiment of the present invention. In one embodiment, the identification signal corresponds to identification indicia (described in detail below) encoded upon a side surface 41 of the card 10.

A Referring to FIG. 4, an encapsulant 44, such as an encapsulating epoxy resin material, is subsequently formed to encapsulate a portion of the substrate 18. Resin encapsulant 44 covers integrated circuit 54, power source 52, conductive circuitry 30, and a portion of the support surface of substrate 18. Resin encapsulant 44 and substrate 18 define the card-thin housing 27 of the card 10. Substrate 18 comprises the upper surface 40 of card 10 and encapsulant 44 comprises the lower surface 42 of card 10. In one embodiment, housing 27 of card 10 has a length of about 3.375 inches, a width of about 2.125 inches, and a thickness less than or equal to about 0.090 inches. The thickness of the sides 41 is less than the lengths and widths of upper surface 40 and lower surface 42 in the described embodiment.

An exemplary resin encapsulant 44 is a flowable encapsulant. The flowable encapsulant 44 is flowed to encapsulate substrate 18. Encapsulant 44 is subsequently cured following the appropriate covering of the integrated circuit 54, power source 52, conductive circuitry 30, and support surface of substrate 18. The curing of encapsulant 44 forms a composite substrate or solid housing 27 which comprises substrate 18 and encapsulant 44.

In the exemplary embodiment, such epoxy encapsulant 44 constitutes a two-part epoxy having a resin and a hardener which are sufficient to provide a desired degree of flexible rigidity. Further details regarding encapsulation of electronic communication device 10 are described in U.S. patent application Ser. No. 08/800,037, filed Feb. 13, 1997, assigned to the assignee of the present application, and incorporated herein by reference.

Still referring to FIG. 4, some of the sides or side surfaces or edge surfaces 41 of card 10 are shown. The sides 41 extend intermediate upper surface 40 and lower surface 42. Substrate 18 and encapsulant 44 form sides 41 of the illustrated card 10.

In accordance with the present invention, visibly perceptible information 43 is provided upon one or more sides 41 of card 10. In the depicted embodiment, visibly perceptible information 43 comprises alphanumeric characters which are provided upon the encapsulant 44. The illustrated visibly perceptible information 43 comprises identification indicia. More specifically, the illustrated identification indicia identifies the assignee of this patent application, and the date of manufacture and a lot number corresponding to the particular card 10 upon which the indicia is encoded. In particular, identification indicia can identify the particular electronic communication device or card 10 upon which the indicia is encoded. Visibly perceptible information 43 can additionally include information regarding issuance of the card 10 for facilitating the tracking thereof. Visibly perceptible information 43 can comprise more, less or other information.

The height of the visibly perceptible information 43 is represented by dimension "h" in FIG. 4. The height of visibly perceptible information 43 can vary depending upon the dimensions of the specific card 10.

For some card applications, a height of visibly perceptible information 43 of less than 50 mils is utilized and preferred. In particular, one exemplary card 10 comprising an electronic communication device having a thickness less than 90 mils was provided with visibly perceptible information 43 having a height less than 47 mils encoded on a side thereof.

Information or indicia may be provided upon cards of other dimensions according to other embodiments of the present invention. For example, the visibly perceptible information 43 is provided upon conventional cards, such as credit cards, according to the alternative embodiments. Such cards are typically only 30 mils thick (in accordance with the International Standards Organization).

One method of encoding the visibly perceptible information 43 on the card 10 includes printing. The present invention encompasses additional methods of providing the visibly perceptible information on sides 41 of a card 10. In particular, encoding comprises scribing or embossing the visibly perceptible information 43 onto the sides 41 of the card 10 in other embodiments.

Figure 5:
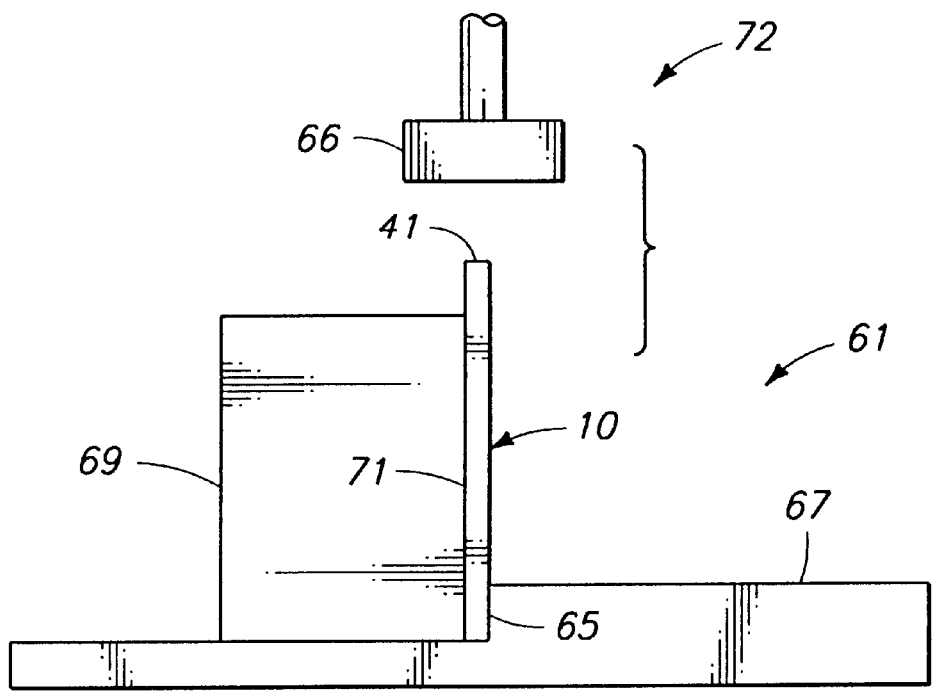
FIG. 5 is an illustrative diagram of a first method and system for providing indicia upon a side of the electronic communication device.
Figure 6:
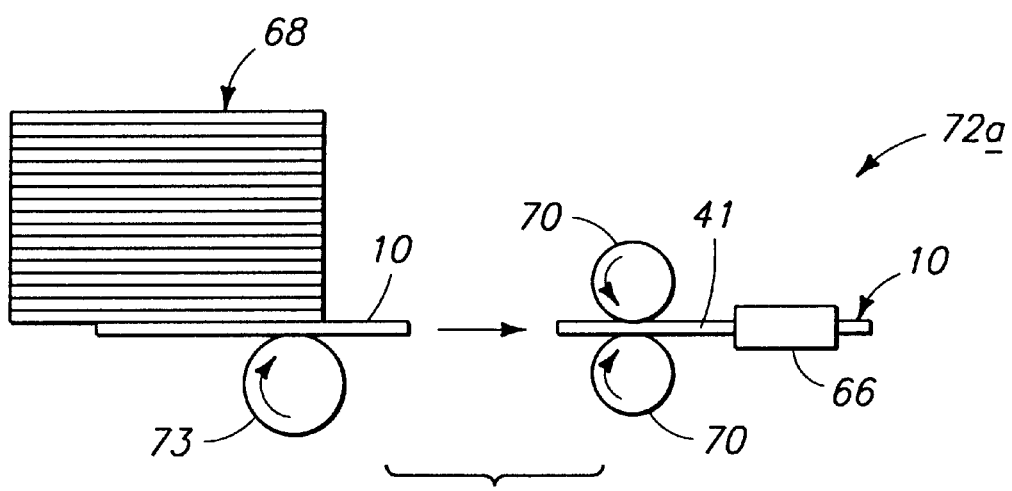
FIG. 6 is an illustrative diagram of another method and system for providing indicia upon a side of the electronic communication device.

Referring to FIG. 5 and FIG. 6, two exemplary methods of providing the visibly perceptible information 43 upon at least one of the sides 41 of the cards 10 are shown. The depicted methods provide for printing the visibly perceptible information 43 onto the sides of the cards 10.

Referring to FIG. 5, a printing station 72 comprises a holding apparatus 61 and a print head 66 configured to print visibly perceptible information 43 upon side surface 41 of the card 10. Apparatus 61 comprises a base support structure 67 and a holding member 69. The illustrated base support structure 67 includes a raised edge 65 for assisting with the holding of the card 10 to be processed. Holding member 69 is provided in an opposing relation to raised edge 65 and is configured hold a card 10 in preferably perpendicular or upright position therebetween.

Holding member 69 is configured to move toward and away from raised edge 65 to respectively hold the card 10 for printing, or permit removal of a processed card 10 or insertion of a card 10 to be processed. Holding member 69 and edge 65 operate to support the card 10 at one side thereof.

Following the fixation of card 10 within apparatus 61, a print head 66 is lowered toward another side 41 of card 10, opposite the supported side thereof. Print head 61 is operable to encode the visibly perceptible information 43 upon side surface 41 of card 10.

Additional print heads may be provided to simultaneously print on plural side surfaces 41 of card 10. The card 10 to be processed remains stationary during the printing thereon by the print head 66 shown in FIG. 5. The depicted holding member 69 is shorter than the card 10 enabling printing on the upper side 41 thereof. Alternatively, holding member 65 is approximately the same length, or slightly less than the length of card 10.

Referring to FIG. 6, an alternative printing station 72a is shown. The cards to be processed are preferably provided in a pre-arranged orientation or stack 68. The stack 68 is provided adjacent a selection roller 73 operable to select a card 10 from stack 68 for processing. One card 10 may be selected while the other cards remain in the prearranged stack 68.

Following the selection of a card 10 via roller 73, the selected card 10 is guided to a pair of driving processing rollers 70 of printing station 72a. Card 10 is provided intermediate processing rollers 70 which subsequently draw card 10 toward print head 66. Print head 66 is positioned adjacent to one side of travel of card 10 provided by processing rollers 70. In this illustrated printing method, processing rollers 70 move card 10 relative to or past stationary print head 66 during the printing of visibly perceptible information 43 on the side surface 41 thereof.

Printing stations 72, 72a include an X-Y grid ink jet plotter according to one aspect of the present invention. More specifically, an exemplary print head 66 comprises a Videojet EXCEL High Resolution Model, available from Video Jet of Woodale, Ill.

The visibly perceptible information or indicia 43 is provided upon encapsulant 44. Numerous conventional cards (e.g., credit cards) comprise materials such as polyvinyl chloride (PVC) or ABS. Such materials allow standard inks to be used for printing the visibly perceptible information 43 on sides 41 of cards 10 by ink jet printing or pad printing.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A remote intelligent communication device comprising:
   a card-thin housing including:
      an upper surface having plural dimensions;
      a lower surface having plural dimensions; and
      at least one side having a dimension extending between the upper surface and the lower surface forming the card-thin housing, the side having visibly perceptible information thereon and the dimension of the side being less than smallest dimensions of the upper and lower surfaces; and
   communication circuitry within the housing configured to at least one of communicate and receive electronic signals.

2. The remote intelligent communication device according to claim 1 wherein the housing comprises a substrate and an encapsulant.

3. The remote intelligent communication device according to claim 2 wherein the substrate comprises the upper surface and the encapsulant comprises the lower surface.

4. The remote intelligent communication device according to claim 1 wherein the card-thin housing has a thickness less than about 100 mils.

5. The remote intelligent communication device according to claim 1 further comprising a processor within the card-thin housing and coupled with the communication circuitry.

6. A radio frequency identification device comprising:
   a housing including:
      an upper surface having plural dimensions;
      a lower surface having plural dimensions; and
      at least one side having a dimension intermediate the upper surface and the lower surface less than smallest dimensions of the upper and lower surfaces, the side having visibly perceptible information thereon; and
   communication circuitry within the housing and the communication circuitry being configured to at least one of communicate and receive electronic signals.

7. The radio frequency identification device according to claim 6 wherein the visibly perceptible information comprises identification indicia of the radio frequency identification device.

8. The radio frequency identification device according to claim 6 wherein the visibly perceptible information is less than about 50 mils in height.

9. The radio frequency identification device according to claim 6 wherein the communication circuitry comprises transponder circuitry.

10. The radio frequency identification device according to claim 6 wherein the housing comprises a substrate and an encapsulant.

11. The radio frequency identification device according to claim 10 wherein the visibly perceptible information is provided on the encapsulant.

12. The radio frequency identification device according to claim 6 further comprising a power source within the housing and coupled with the communication circuitry.

13. A card comprising:
   an upper surface having plural dimensions;
   a lower surface having plural dimensions;
   at least one side having a dimension intermediate the upper and lower surfaces less than smallest dimensions of the upper and lower surfaces; and
   identification indicia on the side.

14. The card according to claim 13 wherein the identification indicia is less than about 50 mils in height.

15. The card according to claim 13 wherein the identification indicia identifies the card.

16. The card according to claim 13 wherein the identification indicia comprises at least one of a manufacturing date of the card and a lot number.

17. The card according to claim 13 wherein the card has a thickness less than about 100 mils.

18. The card according to claim 13 further comprising:
   transponder circuitry intermediate the upper and lower surfaces; and
   a processor intermediate the upper and lower surfaces and coupled with the transponder circuitry.

19. A communication device comprising:
   a substrate having a support surface;
   an antenna on the support surface;
   transponder circuitry coupled with the antenna;
   a battery in electrical connection with the transponder circuitry;

a cured resin upon the support surface, the antenna, the transponder circuitry and the battery, the cured resin and substrate forming a housing having an upper surface and a lower surface interconnected by side surfaces, the side surfaces individually having a dimension less than smallest dimensions of the upper and lower surfaces; and identification indica on at least one of the side surfaces of the housing.

20. The communication device according to claim 19 wherein the housing has a thickness less than about 100 mils.

21. The communication device according to claim 19 wherein the identification indicia is provided on the resin.

22. The communication device according to claim 19 further comprising a processor within the housing and coupled with the transponder circuitry.

23. A method of forming a card comprising:

providing a substrate having:
an upper surface;
a lower surface, and the upper and lower surfaces individually having a length and a width; and
a plurality of sides individually having a thickness less than the lengths and the widths of the surfaces; and encoding visibly perceptible information on at least one of the sides.

24. The method of forming a card according to claim 23 wherein the thickness of the card is less than about 100 mils.

25. The method of forming a card according to claim 23 wherein the visibly perceptible information comprises identification indicia.

26. The method of forming a card according to claim 23 further comprising incorporating transponder circuitry with the substrate.

27. A method of forming a card comprising:

providing a card including an upper surface, a lower surface and a plurality of sides, the sides individually having a dimension less than smallest dimensions of the upper and lower surfaces;

providing a print head;

moving at least one of the card and the print head relative to the other of the card and print head; and using the print head, encoding visibly perceptible information on at least one side of the card.

28. The method of forming a card according to claim 27 wherein the encoding is provided during the moving.

29. The method of forming a card according to claim 27 wherein the visibly perceptible information comprises identification indicia.

30. The method of forming a card according to claim 27 further comprising forming transponder circuitry within the card prior to the encoding.

31. A method of forming a communication device comprising:

providing a first substrate;

providing an antenna supported by the first substrate;

coupling communication circuitry with the antenna on the first substrate;

applying and curing an encapsulant over the first substrate to form a composite substrate including the first substrate and the encapsulant, the composite substrate having upper and lower surfaces and at least one side surface extending therebetween; and encoding visibly perceptible information on the side surface.

32. The method of forming a communication device according to claim 31 wherein the encoding comprises encoding the visibly perceptible information on the encapsulant.

33. The method of forming a communication device according to claim 31 wherein the visibly perceptible information comprises identification indicia.

34. A method of forming a remote intelligent communication device comprising:

providing a substrate;

forming communication circuitry upon the substrate and configured to at least one of communicate and receive electronic signals;

encapsulating the communication circuitry thereby forming a card-thin housing with the substrate, the housing including an upper surface, a lower surface, and at least one side extending between the upper and lower surfaces, the side having a dimension less than smallest dimensions of the upper and lower surfaces; and encoding visibly perceptible information on the side of the card-thin housing.

35. The method of forming a remote intelligent communication device according to claim 34 wherein the communication circuitry comprises a power source.

36. The method of forming a remote intelligent communication device according to claim 34 wherein the card-thin housing has a thickness less than 100 mils.

37. The method of forming a remote intelligent communication device according to claim 34 wherein the visibly perceptible information comprises identification indicia.

38. The method of forming a remote intelligent communication device according to claim 37 wherein the communication circuitry comprises transponder circuitry configured to generate an identification signal corresponding to the identification indicia.

39. A method of forming a communication device comprising:

providing a substrate;

supporting an antenna on the substrate;

coupling transponder circuitry with the antenna;

mounting a battery to the substrate in electrical connection with the transponder circuitry;

encapsulating the antenna, the transponder circuitry, the battery and at least a portion of the substrate with a flowable encapsulant;

curing the flowable encapsulant on the substrate into a solid housing having an upper surface and lower surface interconnected by side surfaces defining a housing thickness having a dimension less than smallest dimensions of the upper and lower surfaces; and encoding identification indica on at least one of the side surfaces of the housing.

40. The method of forming a communication device according to claim 39 wherein the encoding comprises encoding the identification indicia on the encapsulant.

41. The method of forming a communication device according to claim 39 wherein the identification indicia identifies the communication device.

42. A method of encoding visibly perceptible information on a communication device comprising:

providing a card housing communication circuitry therein, the card having upper and lower surfaces interconnected by side surfaces the side surfaces individually having a dimension less than smallest dimensions of the upper and lower surfaces;

providing a print head;

supporting the card on one of the side surfaces;

moving the print head adjacent another side surface of the card; and encoding identification indicia on the another side surface of the card with the moving print head.

43. The method of encoding visibly perceptible information on a communication device according to claim 42 further comprising:

providing a plurality of said cards in a stack; and printing on the card sides while the plurality of cards is in the stack.

44. The method of encoding visibly perceptible information on a communication device according to claim 42 further comprising:

providing a plurality of said cards in a pre-arranged orientation; and selecting one of the cards prior to the supporting.

45. The method of encoding visibly perceptible information on a communication device according to claim 42 wherein the card has a thickness less than about 100 mils.

46. A method of encoding visibly perceptible information on a communication device comprising:

providing a card housing communication circuitry therein, the card having upper and lower surfaces interconnected by side surfaces, the side surfaces individually having a dimension less than smallest dimensions of the upper and lower surfaces;

providing a print head;

moving the card relative to the print head; and encoding identification indicia on at least one of the side surfaces with the print head while moving the card relative to the print head.

47. The method of encoding visibly perceptible information on a communication device according to claim 46 wherein the moving comprises passing the card by the print head intermediate a pair of driving processing rollers.

48. The method of encoding visibly perceptible information on a communication device according to claim 46 wherein the card has a thickness less than about 100 mils.

49. The method of encoding visibly perceptible information on a communication device according to claim 46 wherein the print head remains stationary relative to the moving card during printing.

* * * * *

(12) EX PARTE REEXAMINATION CERTIFICATE (10714th)
United States Patent
Tuttle

(10) Number: US 6,052,062 C1
(45) Certificate Issued: Sep. 22, 2015

(54) CARDS, COMMUNICATION DEVICES, AND METHODS OF FORMING AND ENCODING VISIBLY PERCEPTIBLE INFORMATION ON THE SAME

(75) Inventor: Mark E. Tuttle, Boise, ID (US)

(73) Assignee: ROUND ROCK RESEARCH, LLC, Mt. Kisco, NY (US)

Reexamination Request:
No. 90/012,268, Apr. 26, 2012

Reexamination Certificate for:
Patent No.: 6,052,062
Issued: Apr. 18, 2000
Appl. No.: 08/920,329
Filed: Aug. 20, 1997

(51) Int. Cl.
*G06K 19/06* (2006.01)
*G06K 19/077* (2006.01)
*G07C 9/00* (2006.01)
*G08C 17/02* (2006.01)

(52) U.S. Cl.
CPC ............ *G07C 9/00309* (2013.01); *G08C 17/02* (2013.01)

(58) Field of Classification Search
None
See application file for complete search history.

(56) References Cited

To view the complete listing of prior art documents cited during the proceeding for Reexamination Control Number 90/012,268, please refer to the USPTO's public Patent Application Information Retrieval (PAIR) system under the Display References tab.

*Primary Examiner* — Margaret Rubin

(57) ABSTRACT

Cards, communication devices, and methods of forming the same and encoding visibly perceptible information on communication devices are provided. A remote intelligent communication device includes: a card-thin housing including: an upper surface; a lower surface; and at least one side extending between the upper surface and the lower surface forming the card-thin housing, the side having visibly perceptible information thereon; and communication circuitry within the housing configured to at least one of communicate and receive electronic signals. A method of forming a card includes: providing a substrate having: an upper surface; a lower surface, and the upper and lower surfaces individually having a length and a width; and a plurality of sides individually having a thickness less than the lengths and the widths of the surfaces; and encoding visibly perceptible information on at least one of the sides.

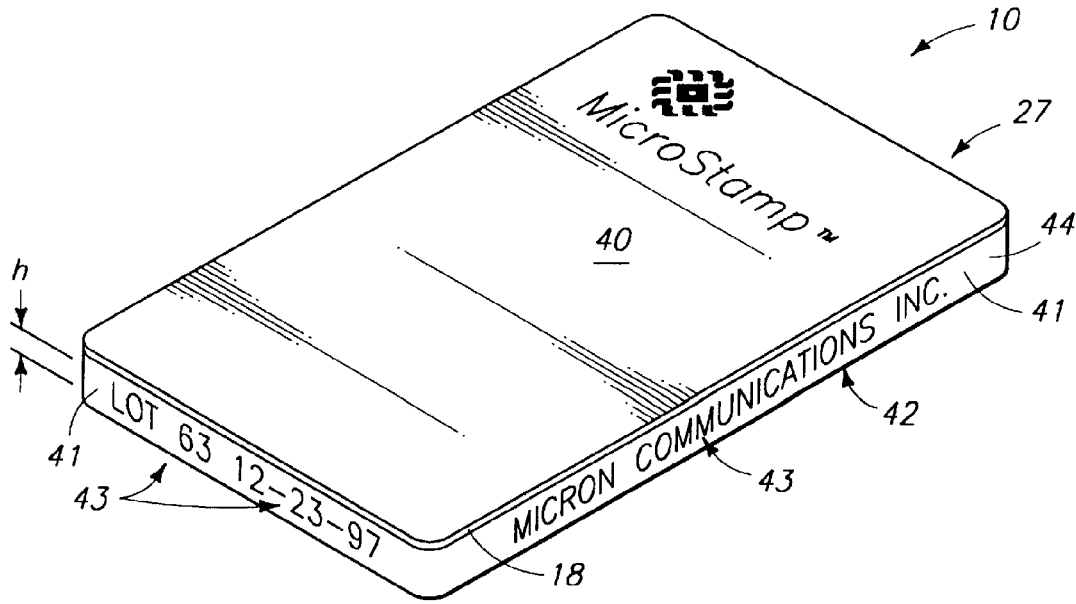

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-49 are cancelled.

* * * * *